United States Patent [19]
Raak

[11] Patent Number: 5,603,803
[45] Date of Patent: Feb. 18, 1997

[54] METHOD AND APPARATUS FOR RECOVERING HEAT IN A SPENT LIQUOR RECOVERY BOILER

[75] Inventor: Keijo Raak, Varkaus, Finland

[73] Assignee: Ahlstrom Machinery Corporation, Noormarkku, Finland

[21] Appl. No.: 416,752

[22] PCT Filed: Oct. 18, 1993

[86] PCT No.: PCT/FI93/00427

§ 371 Date: Apr. 13, 1995

§ 102(e) Date: Apr. 13, 1995

[87] PCT Pub. No.: WO94/09206

PCT Pub. Date: Apr. 28, 1994

[30] Foreign Application Priority Data

Oct. 19, 1992 [FI] Finland .................... 924719

[51] Int. Cl.⁶ .................................... D21C 11/12
[52] U.S. Cl. .................. 162/31; 162/47; 162/375; 110/238; 122/7 R
[58] Field of Search ............... 162/30.1, 29, 31, 162/47, 375; 110/238, 180; 122/7 R; 422/185

[56] References Cited

U.S. PATENT DOCUMENTS 3,915,654  10/1975  Oni ........................................... 23/262

FOREIGN PATENT DOCUMENTS 8303655  12/1985  Sweden.
WO93/17179  3/1993  WIPO.

*Primary Examiner*—Donald E. Czaja
*Assistant Examiner*—Dean T. Nguyen
*Attorney, Agent, or Firm*—Nixon & Vanderhye P.C.

[57] ABSTRACT

A method and apparatus for use in the pulp industry for recovering heat in the spent liquor recovery boiler, whereby the boiler walls are formed of water-cooled tubes connected to the water/steam circulation system of the boiler. The lower section of the boiler is defined by water tubes connected to a separate water circulation system of a forced type. Thus, heat is preferably recovered in the lower section of the boiler by a separate water circulation system having a lower pressure than in the water/steam circulation system of the boiler.

20 Claims, 1 Drawing Sheet

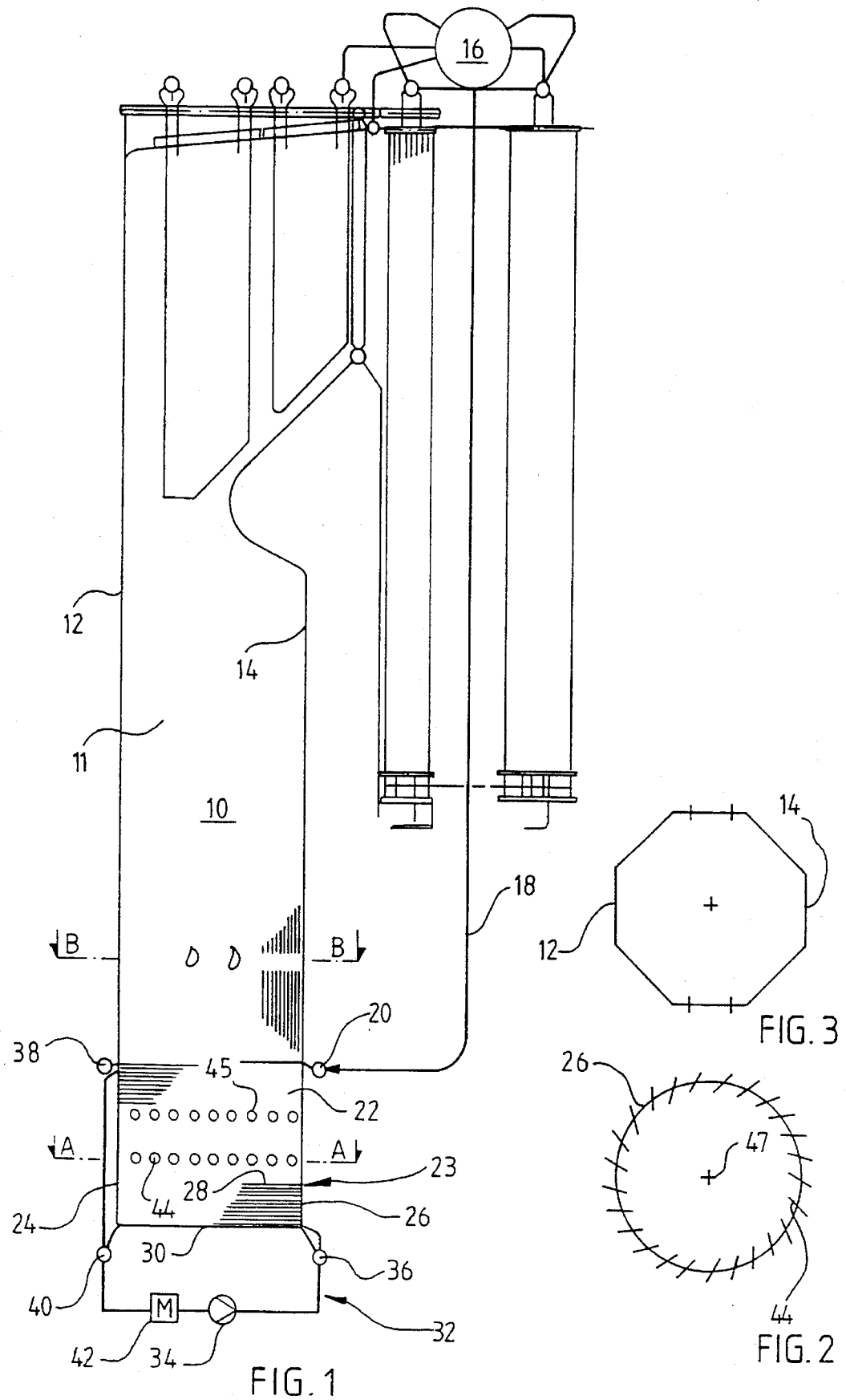

METHOD AND APPARATUS FOR RECOVERING HEAT IN A SPENT LIQUOR RECOVERY BOILER

BACKGROUND AND SUMMARY OF THE INVENTION

The present invention relates to a method and apparatus for use in the pulp industry for recovering heat in a spent liquor recovery boiler, such as a soda recovery boiler, whereby the boiler walls are formed of water-cooled tubes connected to the water/steam circulation system of the boiler.

Recovery and regeneration of cooking chemicals effected in the soda recovery boiler are an essential part of the pulp manufacturing processes. Organic substances dissolved in the spent liquor are combusted, thereby generating heat which is utilized in steam generation. The inorganic matter, i.e., ash contained in the spent liquor, melts at the high temperature prevailing in the soda recovery boiler and flows as melt downwardly onto the bottom of the furnace. The soda recovery boiler also serves as a steam boiler, where heat released during combustion is recovered as steam, primarily by water tubes lining the boiler walls and as high-pressure super-heated steam of, e.g. 450° to 480° C./65 to 85 bar, by superheaters disposed in the upper section of the boiler. The temperature rises very high, often to over 1000° C., inside the furnace of the soda recovery boiler, whereby the conditions in the furnace are highly corroding due to the temperature and the alkali and sulphur compounds contained in the spent liquor.

These special circumstances set constructive demands on the structure of the soda recovery boiler, such demands being different from those set on conventional power plant boilers. Therefore, in the furnace structures used, the whole bottom and walls of the furnace are water cooled in order to prevent the temperature at the tubes from rising to a level favourable to corrosion.

The lower section of the furnace and the bottom of the soda recovery boiler are made of water cooled tubes, which constitute part of the pressurized section of the boiiler. Due to the structure of the bottom and the lower section of the furnace, there is natural circulation of water in the bottom tubes, i.e., the circulation is effected by the difference of density. The boiler water is led at a high pressure and, e.g., over 300° C. temperature below the bottom of the furnace, to the distributing pipe, wherefrom the water is then distributed into the the bottom and wall tubes. In the lower section of the furnace, water first flows nearly horizontally or obliquely upwardly in the bottom tubes and then further upwardly through wall tubes to the upper section of the boiler.

The natural circulation sets limits to the structure of the furnace and bottom of the boiler because all tubes should be either rising or vertical. Furthermore, the natural circulation structure complicates the free layout and shaping of the melt discharge openings and air ports.

Proper water circulation is of crucial importance to the operational safety of the boiler. If the water circulation is disturbed, it may result in overheating of the tube material, and consequently corrosion and tube damage. Great changes in the tube temperature may cause disturbances in the water circulation. Especially in the bottom tubes, where water flows nearly horizontally, even a relatively small disturbance in the water circulation may be fatal.

A bed is formed on the bottom of the furnace, composed of material remaining in the spent liquor after the evaporable and easily combustible substances have been discharged during the pyrolysis stage. The bed contains, e.g., coal/coke, sodium and sulphur. On the bottom of the bed, near the bottom tubes of the furnace, there is a layer of melt formed of inorganic chemicals. This layer of melt flows out of the furnace through an opening or openings in the furnace wall.

The lowermost portion of the layer of chemicals, which is in direct contact with the water-cooled bottom tubes of the furnace, is normally in a solid state due to the cooling effect of the tubes. This solid layer protects the water tubes.

Formation of the solid layer onto the bottom of the furnace may be disturbed by temperature variation in the furnace, shallowness of the bed, unfavourable inclination of the bottom of the furnace or by poor cooling effect of the boiler tubes. In some cases, the state of the layer nearest to the tubes may vary between solid and molten states, whereby the tubes are sometimes covered with a solid and sometimes with a molten layer of chemicals, and sometimes at least of portion of them is totally without any protecting layer thereon.

For reasons described above, the bottom tubes of the boiler may be damaged. For example, fractures or cracks may appear, wherethrough water then finds its way and leaks out of the tubes into the chemical melt. This brings about a danger of a violent explosion between water and melt, i.e., a melt explosion. Such explosions sometimes occur and material damages may rise to millions of Finnmarks. Repairs of the damages may take months, which results in considerable production losses. Sometimes melt explosions have also claimed human lives.

Because of the danger of explosion, the bottom tubes of the boiler have to be inspected frequently in order to discover in good time whether the bottom tubes have corroded or otherwise damaged and whether they therefore have to be replaced or repaired. Spent liquor combustion and steam generation of the soda recovery boiler have to be stopped during the inspection, which is why the inspections should be as infrequent as possible.

Efforts have been made to decrease the danger of damage and explosion by using tube material which better resists corrosion, or by covering the bottom tubes by refractrory material or coating them by corrosion resistant metal to be sprayed on the tubes.

The lower section of the furnace and the bottom of the soda recovery boiler are today generally constructed of compound tube. The compound tube is made of carbon steel and coated with a thin, protective layer of austenitic steel. This structure provides a fairly good protection against corrosion of the wall tube. However, the danger of explosion or other damage has not been completely avoided. Inspections of boilers have revealed cracks and signs of corrosion in compound bottom tubes also under the coating material. Stress or fatigue corrosion is considered to be the cause of cracks. Compound, which is about ten times as expensive as ordinary carbon steel, has not proved to be a final solution for the furnace and bottom material. Unfortunately, the inspection itself may contribute to a damage to the tubes because the protective layer coating the tubes has to be removed for the time of inspection.

An essential change has taken place in use of the soda recovery boilers during the past few years as the dry content of the fuel, i.e. black liquor, has increased. Thus, the effective thermal value of the fuel is higher than before, which clearly raises the combustion temperature. This phenomenon is as such positive with regard to the boiler operation, but it also adds to the thermal stress on the furnace walls and often causes hot corrosion of inefficiently cooled areas; in other words, it increases potential risks.

An object of the present invention is to provide a better method and apparatus than those described above for improving the safety of the recovery boiler.

Primarily, it is an object of the present invention to provide a lower section of the furnace in a recovery boiler, which lower section of the furnace does not easily cause a melt/water explosion.

It is a still further object of the present invention to provide a structure forming the lower section of the recovery boiler furnace, which is easier and faster to replace.

For achieving the objects mentioned hereinabove, it is a characteristic feature of the method according to the invention that heat is recovered, besides the water/steam circulation system of the recovery boiler, by a separate, water circulation system of forced type in the tubes constituting the lower section of the boiler.

Correspondingly, it is a characteristic feature of the apparatus according to the invention that the lower section of the recovery boiler is formed of water tubes connected to a separate, water circulation system of forced type.

The separate, water circulation system of forced type may be limited to the bottom level of the furnace but, preferably, it partly extends to the wall section or wall sections of the furnace. Preferably, the separate, water circulation system of forced type extends at least to the height of the primary and secondary air ports. The tertiary air ports of the furnace are disposed and spent liquor is injected on such a level where the furnace walls are within the ordinary water/steam circulation system of the boiler.

According to a preferred embodiment of this invention, a separately cooled lower section and bottom of the furnace may be constructed of tubes similar or nearly similar to those used for the conventional, presently used furnace bottoms. On the other hand, the lower section and bottom of the furnace may also be constructed of tubes larger or smaller than the wall tubes of the furnace itself or alternatively of tubes or canals, the cross section of which is, e.g., square or rectangular. In the soda recovery boiler according to the invention, the tubes in the lower section of the furnace may be substantially horizontal and arranged to run, e.g., spirally to form the wall of the lower section of the furnace.

Thus, in accordance with the invention, e.g., the bottom of the recovery boiler and a portion of the furnace wall structure are a separate unit, which is cooled by a water circulation system of its own. In accordance with the invention, the portion of the furnace wall where the primary and secondary air ports are disposed, may be a separate structure having a water circulation system of its own. It is naturally possible to provide a larger or a smaller part of the furnace with a separate water circulation system, depending on, e.g., bed formation and heat recovery in the boiler.

In the boiler according to the invention, the separate water circulation is preferably performed at a pressure which is considerably lower than that of the soda recovery boiler, for example, at <30 bar. When the water circulation system of the bottom and the lower section of the boiler is of a forced circulation type, it is possible to freely choose the bottom shape, position of bottom and wall tubes, and layout and shape of the openings in the wall even though the water circulation in the upper section of the boiler is effected by a conventional natural circulation. Thereby, it is possible to provide air feed into the furnace, which is as favourable as possible in view of combustion, and mixing in the furnace, which is as efficient as possible; in other words, a complete rotation firing nowadays much strived for is achievable.

It has been noted that so-called rotation firing has given good results when used in soda recovery boilers. In rotation firing, combustion air is introduced into the furnace in such a manner that the flue gases are caused to circulate in a tangential direction. As a result, air mixes efficiently with combusting gases and brings about highly effective combustion. Intensified combustion raises the temperature of the lower section of the furnace, which as such has a positive effect. Thermal stresses in the wall tubes of the furnace, attributable to the high temperature, can now be avoided with the method of the invention.

By constructing the bottom and the lower section of the furnace so that their pressure is clearly lower than that in the rest of the boiler, it is ensured that all parts susceptible to a heavy thermal stresses will be efficiently cooled. The material chosen for the bottom and the lower section of the furnace may be inexpensive pressure vessel carbon steel, which is known to be well resistant to corrosion caused by chemicals and to thermal stress when the pressure and the consequent surface temperature are low enough, preferably less than 30 bar and 250° C.

In a preferred embodiment according to the invention, where the pressure in the lower section of the furnace is clearly lower than that of the actual boiler, the cooling circulation in the lower section of the furnace is arranged by using a separate water circulation system. The heat recovered to a separate water circulation system may be used, e.g., for heating the boiler feed water, e.g., in a separate heat exchanger, which is connected with the water circulation system by a separate cooling circulation system, whereby the heat released from the cooling of the lower section of the furnace is recovered. Thereby, it is possible to maintain the temperature of the medium flowing in the lower section of the separately cooled furnace nearly constant by regulating the cooling effect of the heat exchanger in the cooling circulation system. The temperature of the cooling medium flowing in the cooling circulation system of the boiler according to the invention is preferably regulated so that it causes the thermal expansion of the separately cooled lower section of the furnace to correlate with the thermal expansion of the walls within the boiler water/steam circulation systems, i.e., no sealing problems exist between the separately cooled lower section and the other furnace structure and no gas or chemical leakages occur between the parts.

The furnace bottom constructed on the forced circulation principle also offers more freedom as to the layout and shape of the required air ports in comparison with the present construction. As known, a round air port is the most preferred solution as to permeability of air. Adjustment of a round port is easier than a generally used slot-shaped port in order to achieve the desired pressure. The structure based on mere natural circulation has not allowed use of round ports, whereas the forced circulation structure allows practically all shapes of ports. With forced circulation boilers according to the invention, the tube and fin dimensions may be chosen within a much wider range than with natural circulation boilers and the areas under the heaviest thermal stress can be better protected.

In accordance with the invention, the pressurized section of the soda recovery boiler is a two-part structure. The lower section of the furnace, which is under a lower pressure, is preferably round, i.e. cylindrical, and vertical. The upper section of the furnace may be round, but preferably it is angular to better facilitate arrangement of the heat transfer surfaces; and to make fitting of the lower section easier, it is preferably a polygon, e.g. a hexagon. Thereby, the round lower section and the high-pressure section more easily form a tight structure. The structure of the part of the high-pressure section above the junction is similar to the structure of present boilers, except for having six angles. Depending on how high up the low-pressure section extends, compound wall tubes may be used in the high-pressure section, preferably in accordance with the present recommendations.

When the lower section of the boiler is provided with a separate water/steam circulation system, the replacement of bottom of the high-pressure boiler, which is necessary every now and then, takes place faster. The lower section of the boiler according to the invention may be built as a compact unit at a workshop, and the installation thereof is considerably faster in comparison with earlier known constructions, where the bottom is connected tube by tube to the wall structure. The manufacturing costs of the low-pressure lower section are clearly lower than those of the earlier known structures.

Most preferably, the construction according to the invention applies to new boilers, where the upper section of the furnace is in the shape of a polygon, most preferably a hexagon. This provides the best possible connection between the round and angular parts of the furnace. Also, when bottoms of present boilers are repaired, it is possible to install new, round lower sections for the furnaces.

The arrangement of the invention provides the advantage that the separate cooling tubes of the lower section of the furnace can be separately, either partly or completely, replaced without having to touch the actual boiler water circulating tubes.

The arrangement of the invention further provides an advantageous bottom structure of the boiler, in which structure tube damages and thereby also melt explosions have been minimized by efficient cooling of the lower section of the boiler.

The invention also provides an advantage of a separate water circulation system being capable of preheating the boiler feed water or, e.g., combustion air.

The invention is described in greater detail in the following, with reference to the accompanying drawings, in which

BRIEF DESCRIPTION OF THE DRAWINGS

FIG. 1 is a schematic vertical section of a recovery boiler having a bottom arrangment according to the invention, FIG. 2 is a horizontal cross-section of the lower section of the recovery boiler of FIG. 1 taken along line A—A, and FIG. 3 is a horizontal cross section of the upper section of the recovery boiler of FIG. 1 taken along line B—B.

DETAILED DESCRIPTION OF THE DRAWINGS

FIG. 1 shows a soda recovery boiler provided with a two-part furnace 10 according to the invention. The walls 12 and 14 of the upper section 11 of the furnace, showing in the Fig. are water walls formed of vertical water tubes by welding them together. The water/steam circulation in the upper section is arranged by natural circulation, whereby the water/steam mixture formed in the tubes rises upwardly via headers into a steam drum 16. From the steam drum, hot water flows via downcomers 18 to the distributing tubes 20 of the water walls.

The lower section 22 of the furnace is formed of tube walls 24 and 26 connected to a separate water circulation system 23. The tube walls 24 and 26 are substantially horizontal tubes one on top of each other; in FIG. 1, tube 28 is spirally wound.

The furnace bottom 30 is also formed of horizontal water tubes. The water tubes of the walls in the lower section and the bottom water tubes are connected to the water circulation system 23 functioning by forced circulation. Water is led by pump 34 to a header 36, wherefrom the water is then distributed into the water walls of the lower section and into the water tubes of the furnace bottom. The water/steam mixture heated in the walls of the lower section is collected in a header 38. Therefrom this mixture and the water/steam mixture from the bottom tubes are introduced into a lower header 40.

From the header 40, the water/steam mixture is taken to a heat exchanger 42 of the cooling circulation system 32 for heat recovery. In the heat exchanger, heat is transferred, e.g., to the feed water of the boiler water/steam circulation system, which is not shown in the Figure. From the heat exchanger, the cooled water of the separate water circulation system is returned by pump 34 to the circulation system 23.

FIG. 2 indicates a horizontal cross section of the lower section of the soda recovery boiler of FIG. 1. The lower section of the boiler is cross-sectionally round. The Figure shows schematically the primary air ports 44 and secondary air ports 45, which are preferably so directioned that the in-flowing air brings about a vortex in the boiler. The air ports 44 and 45 in the cylindrical boiler are disposed symmetrically at equal distances from the center of the furnace 47, which contributes to symmetrical distribution of air into the boiler.

FIG. 3 shows a horizontal cross section of the upper section of the soda recovery boiler of FIG. 1. The cross section of the upper section of the boiler is a hexagon.

It is not an intention to limit the invention to the embodiments described hereinabove, but it may be applied within the inventive scope defined by the accompanying claims. Thus, e.g., the cross-sectional shape of the furnace does not at all restrict the application of the invention. The cross section of the furnace may thus be an ordinary square or a rectangle in shape.

What is claimed is:

1. A method for recovering heat in a spent liquor recovery boiler in the pulp and paper industry, the boiler having walls formed of first water cooled tubes connected to a water/steam circulation system of the boiler, using second water cooled tubes in a lower section of the boiler, said method comprising the steps of:

(a) circulating water in a first circulation, at a first pressure, in the first water cooled tubes and the water/steam circulation system to recover heat from the boiler; and (b) circulating water in a second circulation, at a second pressure less than the first pressure, in the second water cooled tubes to recover heat from the boiler, and wherein the second circulation is not in communication with the water/steam circulation system.

2. A method as recited in claim 1 wherein step (b) is practiced by circulating water in the second circulation at a pressure less than 30 bar.

3. A method as recited in claim 2 wherein the circulating step (a) is practiced by natural circulation, and the circulating step (b) is practiced by forced circulation.

4. A method as recited in claim 3 wherein the boiler has feed water to the water/steam circulation system; and comprising the further step using the heat recovered in step (b) to preheat the feed water to the water/steam circulation system.

5. A method as recited in claim 2 wherein the boiler has feed water to the water/steam circulation system; and comprising the further step using the heat recovered in step (b) to preheat the feed water to the water/steam circulation system.

6. A method as recited in claim 1 wherein the boiler has feed water to the water/steam circulation system; and comprising the further step using the heat recovered in step (b) to preheat the feed water to the water/steam circulation system.

7. A method as recited in claim 1 wherein the circulating step (a) is practiced by natural circulation, and the circulating step (b) is practiced by forced circulation.

8. A spent liquor recovery boiler system in the pulp and paper industry, comprising:

a water/steam circulation system;

a boiler having walls formed of a plurality of first water cooled tubes connected to said water/steam circulation system, said boiler having an upper section and a lower section;

a plurality of second water cooled tubes in said lower section of said boiler;

first means for circulating water in a first circulation, at a first pressure, in said first water cooled tubes and the water/steam circulation system to recover heat from said boiler; and second means for circulating water in a second circulation, at a second pressure less than the first pressure, in said second water cooled tubes to recover heat from said boiler and said second circulation not in communication with said water/steam circulation system.

9. A boiler system as recited in claim 8 wherein said first circulating means comprises a natural circulating means, and wherein said second circulating means comprises a forced circulating means including a pump.

10. A boiler system as recited in claim 9 wherein said boiler lower section is cylindrical, having a circular cross section.

11. A boiler system as recited in claim 10 wherein said boiler upper section is polygonal in cross section.

12. A boiler system as recited in claim 8 wherein said boiler upper section is hexagonal in cross section, and said boiler lower section is cylindrical, having a circular cross section.

13. A boiler system as recited in claim 8 wherein said second water cooled tubes extend primarily horizontally.

14. A boiler system as recited in claim 8 further comprising a heat exchanger connected to said water/steam circulation system and said second circulating means for transferring heat from said second water circulating means to said water/steam circulation system.

15. A boiler system as recited in claim 8 wherein said boiler lower section is cylindrical, having a circular cross section, and wherein said second water tubes includes at least one tube extending primarily horizontally while extending in a spiral around said circular lower section.

16. A boiler system as recited in claim 8 wherein said boiler lower section is cylindrical, having a circular cross section, and wherein said lower section includes a plurality of primary air ports and secondary air ports disposed symmetrically around said lower section.

17. A spent liquor recovery boiler system in the pulp and paper industry, comprising:

a water/steam circulation system;

a boiler having walls formed of a plurality of first water cooled tubes connected to said water/steam circulation system, said boiler having an upper section and a lower section;

a plurality of second water cooled tubes in said lower section of said boiler;

first means for circulating water in a first circulation and in said first water cooled tubes and the water/steam circulation system to recover heat from said boiler;

second means for circulating water in a second circulation and in said second water cooled tubes to recover heat from said boiler said second circulation not in communication with said water/steam circulation system;

said upper section having a hexagonal cross section, and said lower section having a circular cross section.

18. A boiler system as recited in claim 17 wherein said first circulating means comprises a natural circulating means, and wherein said second circulating means comprises a forced circulating means including a pump.

19. A boiler system as recited in claim 17 wherein said second water cooled tubes extend primarily horizontally, in a spiral along said circular lower section.

20. A boiler system as recited in claim 18 further comprising a heat exchanger connected to said water/steam circulation system and said second circulating means for transferring heat from said second water circulating means to said water/steam circulation system.

* * * * *